United States Patent [19]

Hofmann

[11] Patent Number: 4,921,232
[45] Date of Patent: May 1, 1990

[54] HYDRAULIC-DAMPING ENGINE MOUNT HAVING AN OVERFLOW CONDUIT BETWEEN TWO CHAMBERS WITH A FIXED INTERMEDIATE WALL

[75] Inventor: Manfred Hofmann, Hünfelden, Fed. Rep. of Germany

[73] Assignee: Metzeler GmbH, Munich, Fed. Rep. of Germany

[21] Appl. No.: 243,432

[22] Filed: Sep. 12, 1988

[30] Foreign Application Priority Data

Sep. 10, 1987 [DE] Fed. Rep. of Germany ....... 3730425

[51] Int. Cl.$^5$ ...................... B60G 15/04; F16F 15/04
[52] U.S. Cl. .................................. 267/219; 267/140.1
[58] Field of Search ...................... 267/35, 140.1, 219, 267/140.1 A; 180/300, 312; 248/562, 636, 638, 566; 123/192 R, 195 A; 138/177, 111, 115, 116, 37, 40

[56] References Cited

U.S. PATENT DOCUMENTS 4,697,794 10/1987 Brenner et al. ................. 248/562 X

FOREIGN PATENT DOCUMENTS

| 0040290 | 2/1984 | European Pat. Off. |
|---|---|---|
| 0231233 | 12/1984 | Japan ..................... 267/219 |
| 0140635 | 6/1986 | Japan ..................... 267/219 |
| 6274130 | 12/1986 | Japan ..................... 248/562 |

*Primary Examiner*—Robert J. Oberleitner
*Attorney, Agent, or Firm*—Herbert L. Lerner; Laurence A. Greenberg

[57] ABSTRACT

A hydraulic-damping engine mount includes a working chamber, a frustoconical elastomeric support spring surrounding the working chamber, a compensating chamber, and a soft-elastic cup-shaped diaphragm bordering the compensating chamber. A partition is disposed between the chambers. The circular-annular overflow conduit through which the chambers hydraulically communicate with each another has a substantially rectangular cross section and is in the vicinity of the partition. At least one rib-like intermediate wall inside the overflow conduit extends in the circumferential direction and extends vertically over a portion of the height of the overflow conduit.

5 Claims, 1 Drawing Sheet

HYDRAULIC-DAMPING ENGINE MOUNT HAVING AN OVERFLOW CONDUIT BETWEEN TWO CHAMBERS WITH A FIXED INTERMEDIATE WALL

SPECIFICATION

The invention relates to a hydraulic-damping engine mount having a working chamber surrounded by a frustoconical elastomeric support spring and a compensating chamber bordered by a soft-elastic cup-shaped diaphragm, the chambers communicating with one another through a circular-annular overflow conduit in the vicinity of a partition disposed between the chambers.

A mount of this kind is known from European Patent No. 0 040 290. Due to the column of liquid stored in the long circular overflow channel extending between the working chamber and the compensating chamber of that mount, strong damping is provided if a vibration of relatively high amplitude is induced. The damping is dictated on one hand by the quantity of liquid stored in the overflow conduit and on the other by the friction of the fluid along the conduit walls. Although the hydraulic damping thus attained is relatively great, it has a very narrow band. In other words, the damping maximum only extends over a narrow frequency band.

It is accordingly an object of the invention to provide a hydraulic-damping engine mount, which overcomes the hereinafore-mentioned disadvantages of the heretofore-known devices of this general type, which also exhibits strong damping, but in which the damping extends over a wide frequency band, that is over a much wider band than was previously possible with the use of a "long" overflow conduit.

With the foregoing and other objects in view there is provided, in accordance with the invention, a hydraulic-damping engine mount, comprising a working chamber, a frustoconical elastomeric support spring surrounding the working chamber, a compensating chamber, a soft-elastic cup-shaped diaphragm bordering the compensating chamber, a partition disposed between the chambers, a circular-annular overflow conduit with a substantially rectangular cross section in the vicinity of the partition through which the chambers hydraulically communicate with each another, and at least one rib-like intermediate wall inside the overflow conduit extending in the circumferential direction and extending vertically over a portion of the height of the overflow conduit.

Given a matching hydraulic cross section, an intermediate wall of this kind increases the surface area of the conduit, and thus increases the frictional components of the conduit flow as well. It is thus possible to attain a considerably wider-band capability, with the same frequency location of the maximum damping.

In accordance with another feature of the invention, there is provided a metal chamber wall bordering a portion of the working chamber, the overflow conduit being formed in the metal chamber wall and having a bottom, and the overflow conduit having an inlet opening opening spirally inward toward the working chamber and an outlet opening beginning at the bottom of the conduit and discharging into the compensating chamber.

In accordance with a further feature of the invention, the at least one intermediate wall is in the form of at least two intermediate walls being mutually parallel and spaced apart at regular intervals defining partial conduits therebetween with identical cross sections.

In accordance with a concomitant feature of the invention, the at least one or at least two intermediate walls have detached ends in the vicinity of the inlet and outlet openings.

Other features which are considered as characteristic for the invention are set forth in the appended claims.

Although the invention is illustrated and described herein as constructed in a hydraulic-damping engine mount, it is nevertheless not intended to be limited to the details shown, since various modifications and structural changes may be made therein without departing from the spirit of the invention and within the scope and range of equivalent of the claims.

The construction and method of operation of the invention, however, together with additional objects and advantages thereof will be best understood from the following description of specific embodiments when read in connection with the accompanying drawings.

Figure 1:
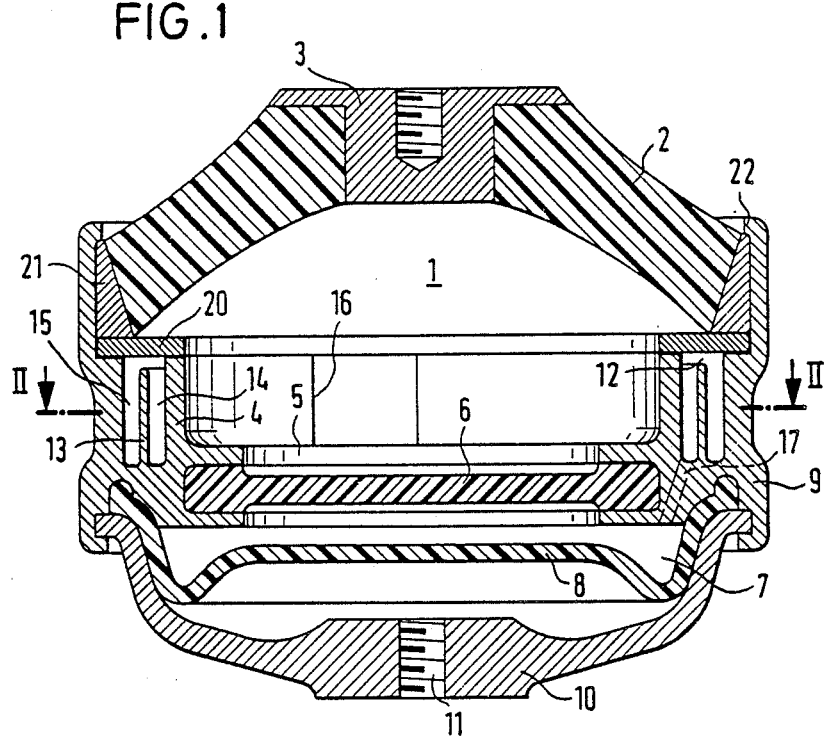
FIG. 1 is a diagrammatic, longitudinal-sectional view of an engine mount.

Referring now to the figures of the drawings in detail and first, particularly, to FIG. 1 thereof, there is seen an engine mount having a working chamber 1, which is defined toward the top by a frustoconical elastomeric support spring 2 having a central bearing plate 3 for attachment of a non-illustrated engine, and is defined toward the lower portion by a chamber wall 4 and by a decoupling diaphragm 6 fastened in a horizontal partition 5. A compensating chamber 7 which located on the other side of the partition 5 is defined by a soft-elastic cup-shaped diaphragm 8 and is covered with respect to the outside by a cap 10 that is retained in a housing 9 and has a threaded bore 11 for connection to the vehicle body. The working chamber 1 and the compensating chamber 7 communicate hydraulically with one another through a circular-annular conduit 12 to be described in further detail below.

Figure 2:
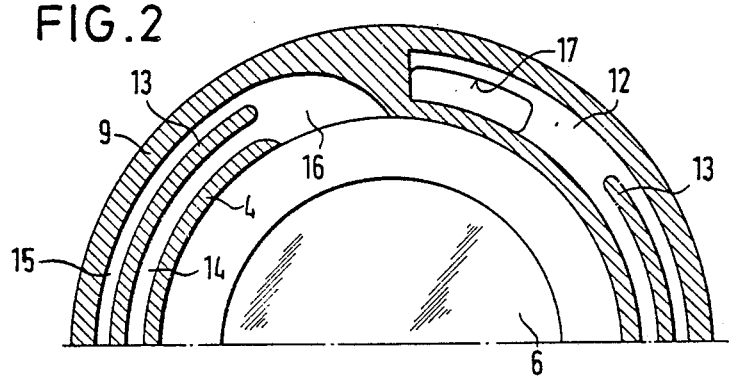
FIG. 2 is a cross-sectional view of one half of the engine mount, taken along the line II—II of FIG. 1, in the direction of the arrows.

The overflow conduit 12 is suitably cut into the vicinity of the reinforced wall of the housing 9 from above and is constructed in such a way that an intermediate wall 13 remains in the middle which extends over a portion of the height of the conduit. This means that the overflow conduit 12, which has an approximately rectangular shape, is divided by this intermediate wall 13 into two partial conduits 14 and 15. The height of the intermediate wall 13 may be selected so as to suit particular requirements. It is important, however, for this intermediate wall 13 to enlarge the possible wall friction surfaces for the liquid in the overflow conduit 12, so that a very much wider-band damping is attained. As is shown particularly in the cross section of FIG. 2, the conduit 12 has an inlet opening 16 that opens spirally inward toward the working chamber 1, while the intermediate wall 13 terminates at the inner edge of the chamber wall 4. An outlet opening 17 which begins at the bottom of the conduit 12 and is provided at the other end of the circular-annular overflow conduit 12, furnishes the hydraulic communication with the compensating chamber 7. At the outlet end of the overflow conduit 12, the intermediate wall 13 terminates at a predetermined distance from the outlet opening 17, so as to assure that the outlet flow will be free of turbulence.

The overflow conduit 12 is covered toward the top with a ring 20 before the actual support spring 2 with an adhering ring 21 is mounted on it, and the housing 9 is flanged inward at an upper edge 22, thus assuring a fluid-tight connection.

Figure 3:
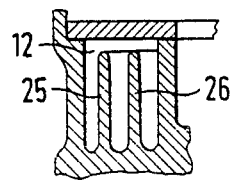
FIG. 3 is a fragmentary, longitudinal-sectional view of a modified embodiment of an overflow conduit.

FIG. 3 shows a fragmentary cross section through another possible embodiment the conduit 12, in which two intermediate walls 25 and 26 are provided, between which corresponding partial conduits are defined. Due to this type of disposition of two intermediate walls, it is possible to increase the friction for the conduit flow even further, with the same conduit cross section.

Naturally, it is possible to instead produce the above-described intermediate walls in the overflow conduit in some other manner, such as in the form of inserts mounted in the conduit, which may also begin at the upper covering ring and thus will allow particularly easy access and will permit subsequent modification.

With the disposition of such an intermediate wall in an overflow conduit of hydraulically damped mounts, it is accordingly generally possible to improve the damping and in particular the wide-band characteristic of the damping, without having to increase the length of the conduit, which would often be difficult to do.

I claim:

1. Hydraulic-damping engine mount, comprising a working chamber, a frustoconical elastomeric support spring surrounding said working chamber, a compensating chamber, a soft-elastic cup-shaped diaphragm bordering said compensating chamber, a partition disposed between said chambers, a circular-annular overflow conduit with a substantially rectangular cross section and a given circumferential length in the vicinity of said partition through which said chambers hydraulically communicate with each another, and at least one rib-like fixed intermediate wall inside said overflow conduit extending in the circumferential direction over said given circumferential length and extending vertically over a portion of the height of said overflow conduit defining at least two partial conduits in continuous mutual communication over said given circumferential length for carrying fluid in parallel and in the same direction.

2. Hydraulic-damping engine mount according to claim 1, including a metal chamber wall bordering a portion of said working chamber, said overflow conduit being formed in said metal chamber wall and having a bottom, and said overflow conduit having an inlet opening opening spirally inward toward said working chamber and an outlet opening beginning at said bottom of said conduit and discharging into said compensating chamber.

3. Hydraulic-damping engine mount according to claim 2, wherein said at least one intermediate wall has detached ends in the vicinity of said inlet and outlet openings.

4. Hydraulic-damping engine mount according to claim 1, wherein said at least one intermediate wall is in the form of at least two intermediate walls being mutually parallel and spaced apart at regular intervals defining said partial conduits therebetween with identical cross sections.

5. Hydraulic-damping engine mount according to claim 4, wherein said at least two intermediate walls have detached ends in the vicinity of said inlet and outlet openings.

* * * * *